Jan. 4, 1955  R. H. SHENK  2,698,529
FLEXIBLE SHAFT COUPLING
Filed April 18, 1950
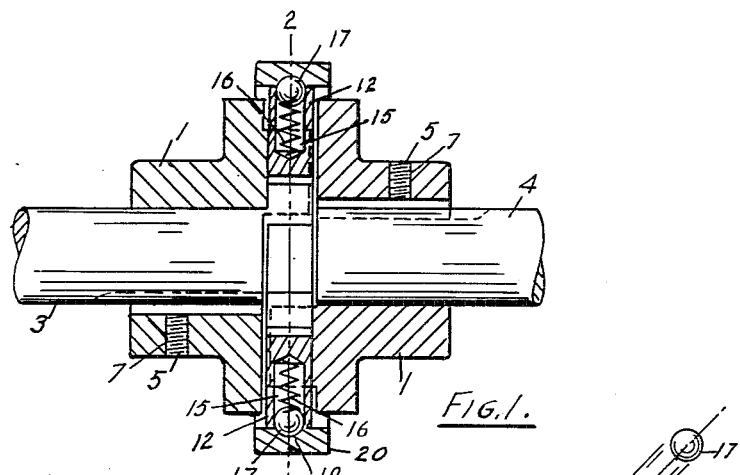
FIG. 1.
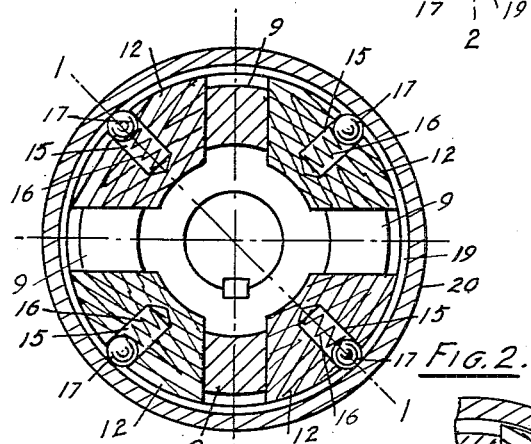
FIG. 2.
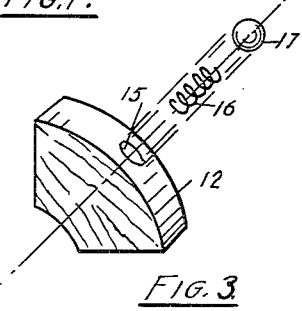
FIG. 3.
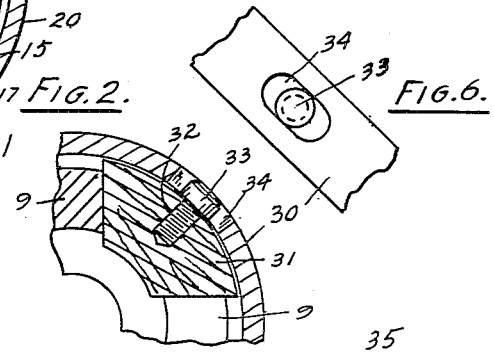
FIG. 5.
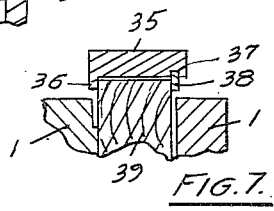
FIG. 6.
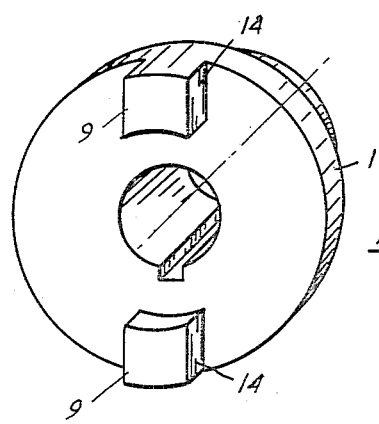
FIG. 4.
FIG. 7.
INVENTOR.
ROBERT H. SHENK
BY
Florian G. Miller
Atty.

United States Patent Office 2,698,529
Patented Jan. 4, 1955

2,698,529
FLEXIBLE SHAFT COUPLING

Robert H. Shenk, Erie, Pa., assignor to American Flexible Coupling Company, Erie, Pa., a corporation of Pennsylvania Application April 18, 1950, Serial No. 156,598

3 Claims. (Cl. 64—31)

This invention relates generally to shaft couplings and more particularly to flexible shaft couplings by which power can be transmitted from one shaft to another when the shafts are misaligned angularly, off-center, or both; and also to permit a limited amount of relative endwise movement.

All devices of this character made in accordance with the teachings of the prior art, and with which I am familiar, utilize a relatively small portion of their bearing surfaces. None of the couplings now on the market have suitable bearing surfaces between the coupling member and the jaws of the driving and driven members with the result that pressures are localized causing excessive wear in a localized portion of the engaging bearing surfaces.

It is, accordingly, an object of my invention to provide a flexible shaft coupling which overcomes the above and other defects in present flexible shaft couplings and one which is simple in construction, economical in cost, economical in manufacture, and efficient in operation.

Another object of my invention is to provide a flexible shaft coupling in which the wear on the engaging surfaces is distributed over the entire area designed therefor to greatly increase the life of the coupling member between the jaws of the driving and driven members of a coupling.

Another object of my invention is to provide a flexible shaft coupling in which unbalanced centrifugal forces are minimized.

Another object of my invention is to provide a flexible shaft coupling wherein torque is transmitted between the driving and driven members through surfaces which are disposed in substantially perpendicular planes intersecting substantially at the axis of the coupling, the driving parts partaking of sliding movement in these planes to permit misalignment of the coupled members.

Another object of my invention is to provide a flexible shaft coupling of simple and compact construction having novel means for coupling rotatable shafts so that the shafts may be universally movable and they are coupled in such manner as to rotate in unison without undue binding or excessive wear while the shafts are in various axially misaligned positions.

Another object of my invention is to provide a novel flexible shaft coupling which provides a maximum of wearing surface with minimum time and materials necessary for replacement due to wear.

Other objects of my invention will become evident from the following detailed description, taken in conjunction with the accompanying drawings, in which Fig. 1 is a view taken on the line 1—1 of Fig. 2 of my novel coupling;

Fig. 2 is a view taken on the line 2—2 of Fig. 1;

Fig. 3 is a perspective view of one of the sectors in the coupling shown in Figs. 1 and 2 with the spring and ball carried thereby in an exploded position;

Fig. 4 is a perspective view of the driving or driven member of my novel coupling;

Figs. 5 and 7 are fragmentary sectional views of a modified form of a fastening device for the ring surrounding my novel coupling; and Fig. 6 is a fragmentary plan view of the fastening member shown in Fig. 5.

Referring now to the drawings, I show in Figs. 1 to 4 inclusive opposed, complementary hubbed members 1 keyed on the ends of shafts 3 and 4. The members 1 are alike and may be driving members or driven members capable of operating in a forward or in a reverse direction.

Locking screws 5 threadably engage threaded apertures 7 in the hubs of the members 1 to lock them on the shafts 3 and 4 respectively. Each of the members 1 has diametrically opposed lugs 9 which are at right angles to each other when they are connected together as shown in Fig. 2. Segmental members 12 made of any suitable material are disposed between the side bearing surfaces 14 of adjacent lugs 9. The segmental members 12 have radially extending recesses 15 for receiving a spring 16 and a ball 17, the ball 17 engaging an internal peripheral groove 19 in a ring 20. The ring 20 permits the segmental members 12 to move laterally relative to the lugs 9 a limited amount to compensate for misalignment of connected shafts 3 and 4; however, the ring 20 maintains the segmental members 13 in engagement with the side bearing surfaces 14 of the lugs 9 at all times. The segmental members 12 are preferably made of a material which requires no lubricant. A material of this type may be an impregnated wood, lignum vitae, self-lubricating metals and like materials.

My coupling is connected to the shafts 3 and 4 by placing the members 1 on the ends of the driving and driven shafts 3 and 4 in opposed complementary relationship with the lugs 9 at right angles to each other as shown in Fig. 1. The segmental blocks 12 are then disposed between the side bearing surfaces 14 of the lugs 9 of the members 1. The springs 16 and balls 17 are then disposed in the recesses 15 in the segmental members 12 and the retaining ring 20 is snapped over the balls 17 with the groove 19 thereof in engagement with the balls 17. The wear of the bearing surfaces 14 on the segmental members 12 and the sides 14 of the lugs 9 is substantially equal on all parts thereof thereby providing for maximum life inasmuch as there is no localized pressure thereon.

The segmental blocks 12 may be replaced when worn without moving the shafts 3 and 4 longitudinally and without the necessity of loosening the foundation of connecting machines such as is required in the use of many types of flexible coupling members now in use.

My novel coupling minimizes the centrifugal forces produced because of the ring 20 thereby permitting relatively high speeds of the coupling without any fear of losing any of the parts thereof or causing a breakdown. In my novel coupling, the forces are distributed around the entire periphery thereof thereby minimizing any centrifugal forces set up and preventing any localized force. The ring 20 is spaced a sufficient distance from the outer side of the segmental members 12 and the lugs 9 to permit limited lateral movement of the segmental blocks 12 relative to the side bearing surfaces 14 of the lugs 9 to permit misalignment of the driving and driven shafts 3 and 4. There is also clearance provided between the ends of the lugs 9 of the member 1 and the face of an opposing member to permit limited longitudinal movement.

Although I have described the shafts 3 and 4 as driving and driven shafts for convenience, they may be reversed as the members 1 thereon are complementary to each other and alike.

In Figs. 5 and 6, I show a modified form of fastening for a ring 30 similar to ring 20 in Figs. 1 and 2. Segmental members 31 have threaded recesses 32 for threadably engaging headed screws 33, the heads of which move in elongated slots 34 in the ring 30.

In Fig. 7, a ring 35 has a depending inwardly directed flange 36 on one side thereof and a peripheral groove 37 on the opposite side thereof for receiving a locking ring 38, the segmental members 39 being disposed between the depending flange 36 and the locking ring 38.

It will be evident from the foregoing description that I have provided a novel coupling which permits misalignment sidewise and angularly, which permits comparatively high speeds because of the means used to resist and distribute centrifugal forces on the parts thereof, which is easily lubricated, which is durable, which has wearing parts which are removable without disconnecting the coupling from the shafts, and which has maximum bearing surfaces between the coupling member and the jaws of the driving and driven members to minimize wear on any particular localized surface.

Various changes may be made in the specific embodiment of my invention without departing from the spirit thereof or from the scope of the appended claims.

What I claim is:

1. A coupling comprising spaced complementary members, each member having diametrically opposed lugs with parallel flat sides disposed at right angles to the parallel flat sides of the lugs of the opposing complementary member, coupling means between the sides of said lugs comprising segmental members, each segmental member presenting a bearing surface extending substantially parallel to the bearing surface of adjacent segmental members, and a ring carried by said segmental members for holding said segmental members between said lugs, said ring having an internal peripheral groove and said segmental members having spring urged balls for engaging said groove for securing said ring around the outer side of said segmental members.

2. A coupling comprising spaced complementary members, each member having diametrically opposed lugs with parallel flat sides disposed at right angles to the parallel flat sides of the lugs of the opposing complementary member, coupling means between the sides of said lugs comprising segmental members, each segmental member presenting a bearing surface extending substantially parallel to the bearing surface of an adjacent segmental member, a ring, and means on said segmental members for holding said ring on said segmental members, said means for holding said ring comprising members slidably supported on said segmental members engaging an internal peripheral groove in said ring.

3. A coupling comprising spaced complementary members, each complementary member having two spaced lugs, coupling means disposed between the lugs, said coupling means comprising segmental members, a ring, and means supporting said ring on said segmental members whereby said segmental members are held in operative relation to said lugs, said ring having an internal circumferential groove receiving said supporting means whereby said ring is rotatable with respect to said segmental members, said supporting means comprising helical springs supported in radial bores in said segments urging said coupling means away from said ring.

References Cited in the file of this patent

UNITED STATES PATENTS

| Number | Name | Date |
|---|---|---|
| 1,070,233 | Curtis | Aug. 12, 1913 |
| 1,316,011 | Bailey et al. | Sept. 16, 1919 |
| 2,092,704 | Ricefield | Sept. 7, 1937 |
| 2,295,003 | Natkins | Sept. 8, 1942 |
| 2,301,659 | Ricefield | Nov. 10, 1942 |